United States Patent
Ishikawa et al.

(10) Patent No.: US 6,222,004 B1
(45) Date of Patent: Apr. 24, 2001

(54) BRANCHED POLYCARBONATE RESIN

(75) Inventors: Yasuhiro Ishikawa; Masaya Okamoto, both of Ichihara (JP)

(73) Assignee: Idemitsu Petrochemical Co., LTD, Tokyo (JP)

( * ) Notice: Subject to any disclaimer, the term of this patent is extended or adjusted under 35 U.S.C. 154(b) by 0 days.

(21) Appl. No.: 09/554,596

(22) PCT Filed: Nov. 20, 1998

(86) PCT No.: PCT/JP98/05248

§ 371 Date: May 26, 2000

§ 102(e) Date: May 26, 2000

(87) PCT Pub. No.: WO99/28369

PCT Pub. Date: Jun. 10, 1999

(30) Foreign Application Priority Data

Nov. 27, 1997 (JP) .................................................... 9/325833

(51) Int. Cl.$^7$ ...................................................... C08G 64/00
(52) U.S. Cl. ............................................. 528/196; 528/198
(58) Field of Search ................................................ 528/196

(56) References Cited

U.S. PATENT DOCUMENTS

| 5,171,824 | * | 12/1992 | Marks et al. | .......................... | 528/198 |
| 5,198,527 | * | 3/1993 | Marks et al. | .......................... | 528/198 |
| 5,942,594 |   | 8/1999  | Nakae et al. | .......................... | 528/196 |

* cited by examiner

*Primary Examiner*—Terressa M. Boykin
(74) *Attorney, Agent, or Firm*—Oblon, Spivak, McClelland, Maier & Neustadt, P.C.

(57) ABSTRACT

A tetrahydric phenol having a specific structure, such as α,α'-dimethyl-α,α,α',α'-tetrakis(4-hydroxyphenyl)-p-xylene, is used as the branching agent in producing a branched polycarbonate resin. The resin has a branching agent content (branching agent/(dihydric phenol+chain terminator+branching agent)×100) of from 0.01 to 0.4 mol %, and an intrinsic viscosity [λ] of from 0.5 to 0.6, and is substantially free from crosslinks. The resin has such a reduced branching agent content and has good melt characteristics including high melt tension. It exhibits improved moldability in blow molding, etc., and gives good moldings especially having improved appearances and color tone.

4 Claims, No Drawings

BRANCHED POLYCARBONATE RESIN

TECHNICAL FIELD

The present invention relates to a branched polycarbonate resin, precisely to a branched polycarbonate resin that exhibits improved moldability in blow molding and so on and gives good moldings especially having improved appearances and color tone.

BACKGROUND OF THE INVENTION

Generally having good transparency, good heat resistance and good mechanical properties, polycarbonate resins to be produced from bisphenol A and others have many applications in various fields. However, the polycarbonate resins generally have low melt tension. Therefore, when molded through blow molding, extrusion, vacuum forming and so on, they are often defective in that their moldings could not all the time have even thickness. In addition, as they often draw down while being molded, they could not be formed into satisfactory moldings.

For overcoming the defects, Japanese Patent Laid-Open No. 47228/1984 discloses a method of adding from 0.1 to 2.0 mol % or so of a branching agent having three functional groups to a polymerization system to give a branched polycarbonate resin.

The melt tension of the branched polycarbonate resin as produced according to that method could surely be increased in some degree, but is not still on a satisfactory level. On the other hand, in order to produce a branched polycarbonate resin having a satisfactory level of melt tension according to the method, a large amount of the branching agent must be used. In that case, however, increasing the amount of the branching agent added will lead to an unfavorable situation where crosslinked polycarbonate resins are readily produced. This is problematic in that the resins are often gelled. In addition, it is said that, with the increase in the branching agent added, the impact resistance of the polycarbonates produced is to lower. For these reasons, the acceptable amount of the branching agent is limited, and it is desired to reduce as much as possible the amount of the branching agent to be added.

The object of the present invention is to provide a branched polycarbonate resin of which the branching agent content is controlled low, which has good melt characteristics including high melt tension, and has good heat stability, and which therefore can be stably produced and molded even through blow molding, extrusion, vacuum forming and so on without being yellowed during the residence time in the molding process.

We, the present inventors have already invented a branched polycarbonate resin having good melt characteristics including high melt tension, for which is used a tetrahydric phenol having a specific structure and serving as a branching agent with the amount of the branching agent to be used being controlled low (Japanese Patent Application No. 228742/1997).

DISCLOSURE OF THE INVENTION

We, the present inventors have assiduously studied so as to obtain a polycarbonate having better heat stability, and, as a result, have found that, when a tetrahydric phenol having a specific structure is used as the branching agent in producing the polymer, then the above-mentioned object can be attained. On the basis of this finding, we have completed the present invention Specifically, the invention provides a branched polycarbonate resin for which is used a tetrahydric phenol having a structure of the following general formula (1) and serving as a branching agent, and which has a branching agent content (that is, the ratio of the branching agent in terms of mol % to the total by mol of (dihydric phenol+chain terminator+branching agent)) of from 0.01 to 0.4 mol % and an intrinsic viscosity [λ] of from 0.5 to 0.6, and is substantially free from crosslinks:

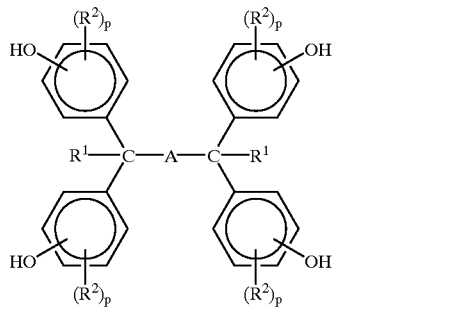

(1)

wherein A, $R^1$, $R^2$ and p are as follows:

A represents a polymethylene group having from 7 to 20 carbon atoms, an alkylene or alkylidene group having from 2 to 20 carbon atoms but excluding polymethylene groups having from 1 to 6 carbon atoms, a cycloalkylene or cycloalkylidene group having from 5 to 20 carbon atoms, an arylene or alkylarylene group having from 6 to 20 carbon atoms, an arylalkylene group having from 6 to 20 carbon atoms, —O—, —CO—, —S—, —SO—, or —$SO_2$—;

$R^1$ represents a hydrogen atom, an alkyl group having from 1 to 8 carbon atoms, an aryl group having from 6 to 20 carbon atoms, or an arylalkyl group having from 7 to 20 carbon atoms, and $R^1$'s may be the same or different;

$R^2$ represents a halogen atom, an alkyl group having from 1 to 8 carbon atoms, an aryl group having from 6 to 20 carbon atoms, or an arylalkyl group having from 7 to 20 carbon atoms, and plural $R^2$'s, if any, may be the same or different;

p indicates an integer of from 0 to 4; or they are as follows:

A represents a single bond, a polymethylene group having from 1 to 20 carbon atoms, an alkylene or alkylidene group having from 2 to 20 carbon atoms, a cycloalkylene or cycloalkylidene group having from 5 to 20 carbon atoms, an arylene or alkylarylene group having from 6 to 20 carbon atoms, an arylalkylene group having from 6 to 20 carbon atoms, —O—, —CO—, —S—, —SO—, or —$SO_2$—;

$R^1$ represents an alkyl group having from 7 to 20 carbon atoms, an aryl or alkylaryl group having from 6 to 20 carbon atoms, or an arylalkyl group having from 7 to 20 carbon atoms, and $R^1$'s may be the same or different;

$R^2$ represents a halogen atom, an alkyl group having from 1 to 8 carbon atoms, an aryl group having from 6 to 20 carbon atoms, or an arylalkyl group having from 7 to 20 carbon atoms, and plural $R^2$'s, if any, may be the same or different;

p indicates an integer of from 0 to 4.

The invention also provides a branched polycarbonate resin for which is used a tetrahydric phenol having a structure of the following general formula (2) and serving as a branching agent, and which has a branching agent content (that is, the ratio of the branching agent in terms of mol % to the total by mol of (dihydric phenol+chain terminator+branching agent)) of from 0.01 to 0.4 mol % and an intrinsic viscosity [λ] of from 0.5 to 0.6, and is substantially free from crosslinks:

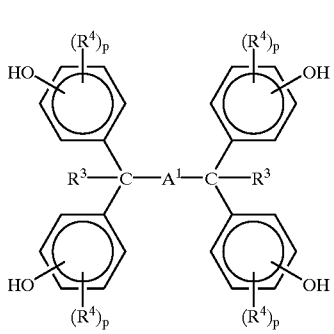

(2)

wherein $A^1$, $R^3$, $R^4$ and p are as follows:
  $A^1$ represents an arylene or alkylarylene group having atom 6 to 20 carbon atoms, or an arylalkylene group having from 6 to 20 carbon atoms,
  $R^3$ represents a hydrogen atom, an alkyl group having from 1 to 8 carbon atoms, an aryl group having from 6 to 20 carbon atoms, or an arylalkyl group having from 7 to 20 carbon atoms, and $R^3$'s may be the same or different;
  $R^4$ represents a halogen atom, an alkyl group having from 1 to 8 carbon atoms, an aryl group having from 6 to 20 carbon atoms, or an arylalkyl group having from 7 to 20 carbon atoms, and plural $R^4$'s, if any, may be the same or different;
  p indicates an integer of from 0 to 4.

BEST MODES OF CARRYING OUT THE INVENTION

The invention is described in detail hereinunder.
1. Branched polycarbonate resin:
The branched polycarbonate resin of the invention is characterized by the following characteristics:
(1) Characteristics:
<1> Branching agent content:
The branching agent content of the resin indicates the mol % of the branching agent in the resin, relative to the number of all mols of (dihydric phenol+chain terminator+branching agent) therein, and falls between 0.01 and 0.4 mol %, but preferably between 0.05 and 0.40 mol %. If the content is smaller than 0.01 mol %, the melt tension of the resin will be low, and blow molding of the resin will be difficult. If, on the other hand, the content is larger than 0.4 mol %, the resin will be crosslinked and gelled whereby the impact resistance of the moldings of the resin will be low.
<2> Intrinsic viscosity [λ]:
The intrinsic viscosity of the resin preferably falls between 0.5 and 0.6. If it is smaller than 0.5, the melt tension of the resin will be low, and blow molding of the resin will be difficult; but if larger than 0.6, the fluidity of the resin will be poor, and the moldability thereof and even the appearances of the resin moldings will be poor.
<3> The branched polycarbonate resin of the invention is characterized in that its intrinsic viscosity [λ] is controlled to fall between 0.5 and 0.6 by reducing its branching agent in the manner as above whereby the resin is substantially free from crosslinks.
(2) Method for production:
The method for producing the branched polycarbonate resin of the invention is not specifically defined, so far as a specific branching agent is used in polymerizing monomers to give the resin. To produce the resin, therefore, any known method is employable.
(i) Starting materials:
The resin of the invention is produced from starting materials of a dihydric phenol, phosgene or a carbonate compound, a branching agent and a chain terminator.
<1> The dihydric phenol includes hydroquinone, 4,4'-dihydroxydiphenyl, bis(4-hydroxyphenyl)alkanes, bis(4-hydroxyphenyl)cycloalkanes, bis(4-hydroxyphenyl) oxide, bis(4-hydroxyphenyl) sulfide, bis(4-hydroxyphenyl) sulfone, bis(4-hydroxyphenyl) ketone, 9,9-bis(4-hydroxyphenyl)fluorene, etc., and their halogenated derivatives. Of those, preferred is 2,2-bis(4-hydroxyphenyl)propane (bisphenol A). These dihydric phenols may be used either singly or as combined. Any other difunctional compounds (for example, dicarboxylic acids such as decanedicarboxylic acid) except dihydric phenols may also be used along with the above-mentioned dihydric phenols.
<2> The carbonate compound includes diaryl carbonates such as diphenyl carbonate, etc.; and dialkyl carbonates such as dimethyl carbonate, dimethyl carbonate, etc. These carbonate compounds may be used either singly or as combined.
<3> The branching agent is represented by the following general formula:

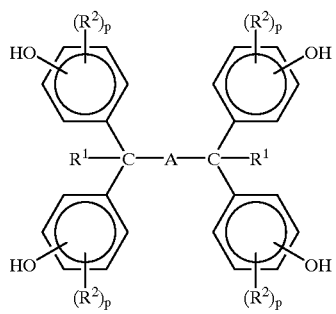

(1)

wherein A, $R^1$, $R^2$ and p are as follows:
  A represents a polymethylene group having from 7 to 20 carbon atoms, an alkylene or alkylidene group having from 2 to 20 carbon atoms but excluding polymethylene groups having from 1 to 6 carbon atoms, a cycloalkylene or cycloalkylidene group having from 5 to 20 carbon atoms, an arylene or alkylarylene group having from 6 to 20 carbon atoms, an arylalkylene group having from 6 to 20 carbon atoms, —O—, —CO—, —S—, —SO—, or —$SO_2$—;
  $R^1$ represents a hydrogen atom, an alkyl group having from 1 to 8 carbon atoms, an aryl group having from 6 to 20 carbon atoms, or an arylalkyl group having from 7 to 20 carbon atoms, and $R^1$'s may be the same or different;
  $R^2$ represents a halogen atom, an alkyl group having from 1 to 8 carbon atoms, an aryl group having from 6 to 20 carbon atoms, or an arylalkyl group having from 7 to 20 carbon atoms, and plural $R^2$'s, if any, may be the same or different;
  p indicates an integer of from 0 to 4; or they are as follows:

A represents a single bond, a polymethylene group having from 1 to 20 carbon atoms, an alkylene or alkylidene group having from 2 to 20 carbon atoms, a cycloalkylene or cycloalkylidene group having from 5 to 20 carbon atoms, an arylene or alkylarylene group having from 6 to 20 carbon atoms, an arylalkylene group having from 6 to 20 carbon atoms, —O—, —CO—, —S—, —SO—, or —SO$_2$—;

$R^1$ represents an alkyl group having from 7 to 20 carbon atoms, an aryl or alkylaryl group having from 6 to 20 carbon atoms, or an arylalkyl group having from 7 to 20 carbon atoms, and $R^1$'s may be the same or different;

$R^2$ represents a halogen atom, an alkyl group having from 1 to 8 carbon atoms, an aryl group having from 6 to 20 carbon atoms, or an arylalkyl group having from 7 to 20 carbon atoms, and plural $R^2$'s, if any, may be the same or different;

p indicates an integer of from 0 to 4.

Preferably, the branching agent has a structure of the following general formula (2):

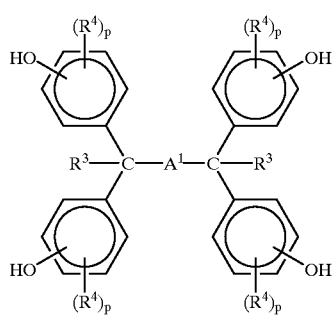

(2)

wherein $A^1$, $R^3$, $R^4$ and p are as follows:

$A^1$ represents an arylene or alkylarylene group having atom 6 to 20 carbon atoms, or an arylalkylene group having from 6 to 20 carbon atoms, $R^3$ represents a hydrogen atom, an alkyl group having from 1 to 8 carbon atoms, an aryl group having from 6 to 20 carbon atoms, or an arylalkyl group having from 7 to 20 carbon atoms, and $R^3$'s may be the same or different;

$R^4$ represents a halogen atom, an alkyl group having from 1 to 8 carbon atoms, an aryl group having from 6 to 20 carbon atoms, or an arylalkyl group having from 7 to 20 carbon atoms, and plural $R^4$'s, if any, may be the same or different;

p indicates an integer of from 0 to 4.

Specific compounds for the branching agent are α, α,α', α'-tetrakis(4-hydroxyphenyl)-p-xylene, α,α,α',α'-tetrakis(3-methyl-4-hydroxyphenyl)-p-xylene, α, α,α',α'-tetrakis(2-methyl-4-hydroxyphenyl)-p-xylene, α, α,α',α'-tetrakis(2,5-dimethyl-4-hydroxyphenyl)-p-xylene, α, α,α', α'-tetrakis(2,6-dimethyl-4-hydroxyphenyl)-p-xylene, α, α'-dimethyl-α, α,α',α'-tetrakis(4-hydroxyphenyl)-p-xylene, α, α'-dimethyl-α, α, α',α'-tetrakis(3-methyl-4-hydroxyphenyl)-m-xylene, and their derivatives as prepared by substituting a part or all of hydrogen atoms except the 4-positioned hydrogen atom with halogen atoms, etc. Of those, preferred is α, α'-dimethyl-α,α, α', α'-tetrakis(4-hydroxyphenyl)-p-xylene.

In the invention, preferably used are those of the branching agents noted above in which the branches are not near to each other, in order that the branches in the branched polycarbonate resin do not crosslink with each other.

These branching agents may be used either singly or as combined. If desired, these may be combined with any other trifunctional branching agents without interfering with the effect of the invention.

<4> The chain terminator is not specifically defined for its structure, provided that it is a monohydric phenol. For example, it includes p-tert-butylphenol, p-tert-octylphenol, p-cumylphenol, p-tert-amylphenol, p-nonylphenol, p-cresol, 2,4,6-tribromophenol, p-bromophenol, 4-hydroxybenzophenone, phenol, etc. These chain terminators may be used either singly or as combined.

(ii) Various additives such as antioxidants, lubricants, anti-weathering agents, colorants, nucleating agents and others may be added to the resin of the invention, so far as they do not interfere with the characteristics of the resin. The antioxidants maybe any known one, but preferred are phosphorus-containing compounds or hindered phenols. Concretely, preferred are tris(2, 4-di-t-butylphenyl) phosphite, trisnonylphenyl phosphite, and octadecyl-3-(3,5-di-t-butyl-4-hydroxyphenyl) propionate. Where the resin is used for sheets in the field of construction materials, anti-weathering agents are preferably added thereto. For foamed sheets, nucleating agents are preferably added to the resin.

EXAMPLES

The invention is described in more detail with reference to the following Examples, which, however, are not intended to restrict the scope of the invention.

In the following Examples and Comparative Examples, the branching agent content, the intrinsic viscosity [λ], MI (melt index), YI (yellow index) and ΔYI of the resin samples produced, and also the appearances of the resin moldings produced were obtained and evaluated according to the methods mentioned below. The data are given in Table 1.

Branching Agent Content

Flakes of a resin sample were decomposed in an alkali, and the branching agent content of the resin was obtained through liquid chromatography.

Intrinsic Viscosity [λ]

Using an Ubbelohde's viscometer, the intrinsic viscosity [λ] (dl/g) of a resin sample was measured in the form of its solution in methylene chloride at 20° C.

Melt Tension

A resin sample was extruded out through an orifice with L/D=8 mm/2.095 mm, at a temperature of 280° C., at an extrusion rate of 10 mm/min, and at a take-up rate of 9.42 m/sec, whereupon the melt tension of the resin was measured with a Toyo Seiki's melt tensiometer.

MI (Melt Index)

Measured according to JIS K7210, at 280° C. and under a load of 21.18 N.

YI (Yellow Index)

Measured with a color meter SM-3 (from Suga Testers) equipped with a quartz cell having an optical guide length of 57 mm.

ΔYI

Flakes of a resin sample were dissolved in methylene chloride to prepare a solution having a resin concentration of 8% by weight. YI of the solution was measured, and this is YIa. On the other hand, the resin flakes were heated in a nitrogen atmosphere at 340° C. for 30 minutes, and then dissolved in methylene chloride to prepare a solution having a resin concentration of 8 % by weight. YI of the solution was measured, and this is YIb. ΔYI is YIb-YIa.

Appearances of Moldings

A resin sample of branched polycarbonate was formed into cylindrical round-bottomed bottles (having a diameter of 67 mm and a height of about 150 mm) through blow molding under the condition mentioned below, and the appearances of the bottles were macroscopically checked and evaluated. The bottles which were transparent to such a degree that letters could be clearly seen through them were evaluated good; but those through which letters were blurred were evaluated not good.

Condition For Blow Molding

Molding machine used: Nippon Seikosho's JEB-7.
Shape of screw: full-flight.
Die/core diameter: 16/14 mm φ (divergent type).
Extrusion rate: 8.0 kg/hr.
Resin temperature: 270° C.

Example 1

Production of Branched Polycarbonate A 0.0215 mols of α,α'-dimethyl-α,α,α',α'-tetrakis(4-hydroxyphenyl)-p-xylene (produced from 1,4-diacetylbenzene and phenol and having a melting point of 307° C.), 9.2 mols of bisphenol A, 9.4 liters of an aqueous solution of 2.0 N sodium hydroxide, and 8 liters of dichloromethane were put into a 50 liters container equipped with a stirrer, and stirred therein, to which phosgene was introduced for 30 minutes. Next, 0.44 mols of bisphenol A, 0.022mols of triethylamine, and 4.5 liters of an aqueous solution of 0.2 N sodium hydroxide were added thereto, and reacted for 40 minutes, and thereafter the aqueous phase and the organic phase in the reaction mixture were separated from each other. Thus was prepared a dichloromethane solution of an oligocarbonate.

0.40 mols of p-tert-butylphenol was dissolved in the resulting oligocarbonate, to which was added a solution of 8.38 mols of sodium hydroxide and 2.2 mols of bisphenol A as dissolved in 4.5 liters of water. To this were further added 0.017 mols of triethylamine and 6 liters of dichloromethane. These were stirred at 500 rpm and reacted for 60 minutes. After the reaction, the aqueous phase and the organic phase in the reaction mixture were separated from each other. No insoluble substances such as gels and the like were found in the organic phase. This supports the absence of crosslinks in the polycarbonate formed. The organic phase was then washed with an alkali (aqueous solution of 0.03 N sodium hydroxide), an acid (0.2 N hydrochloric acid) and water in that order, but washing with water was repeated twice. After having been thus washed, dichloromethane was removed from this. Thus were obtained polycarbonate flakes, which were then dried at 120° C. for 24 hours.

Example 2

Production of Branched Polycarbonate B

The same process as in Example 1 was repeated, except that α, α,α',α'-tetrakis (4-hydroxyphenyl) -p-xylene (prepared from terephthaldicarboxyaldehyde and phenol and having a melting point of 266° C.) was used as the branching agent in place of α,α'-dimethyl-α,α,α',α'-tetrakis (4-hydroxyphenyl) -p-xylene.

Example 3

Production of Branched Polycarbonate C

The same process as in Example 1 was repeated, except that α,α'-dimethyl-α,α,α',α'-tetrakis(3-methyl-4-hydroxyphenyl)-m-xylene (prepared from o-cresol and 1,3-diacetylbenzene and having a melting point of 126° C.) was used as the branching agent in place of α,α'-dimethyl-α, α, α',α'-tetrakis (4-hydroxyphenyl) -p-xylene.

Example 4

Production of Branched Polycarbonate D

To the polycarbonate flakes prepared in Example 1, added were 200 ppm of tris(2,4-di-t-butylphenyl) phosphite and 100 ppm of octadecyl-3-(3,5-di-t-butyl-4-hydroxyphenyl) propionate both serving as an antioxidant. The resulting mixture was extruded and pelletized.

Comparative Example 1

Production of Branched Polycarbonate E

The same process as in Example 1 was repeated, except that the amount of the branching agent,α, α'-dimethyl-α,α, α',α'-tetrakis(4-hydroxyphenyl)-p-xylene was changed to 0.0245 mols and that of p-tert-butylphenol was to 0.39 mols.

Comparative Example 2

Production of Branched Polycarbonate F

The same process as in Example 3 was repeated, except that the amount of α, α'-dimethyl-α, α, α', α'-tetrakis(3-methyl-4-hydroxyphenyl)-m-xylene was changed to 0.0245 mols and that of p-tert-butylphenol was to 0.38 mols.

Comparative Example 3

Production of Branched Polycarbonate G

The same process as in Comparative Example 1 was repeated, except that α, α, α', α'-tetrakis(3-methyl-4-hydroxyphenyl)-p-xylene was used in place of α, α'-dimethyl-α,α,α',α'-tetrakis(4-hydroxyphenyl)-p-xylene. The compound α, α, α',α'-tetrakis(3-methyl-4-hydroxyphenyl)-p-xylene was prepared from terephthaldicarboxyaldehyde and o-cresol, and had a melting point of 195° C.

Comparative Example 4

Production of Branched Polycarbonate H

The same process as in Example 1 was repeated, except that the amount of the branching agent, α, α'-dimethyl-α, α, α',α'-tetrakis (4-hydroxyphenyl)-p-xylene was changed to 0.0640 mols and that of p-tert-butylphenol was to 1.010 mols.

Comparative Example 5

Production of Branched Polycarbonate I

The same process as in Example 1 was repeated, except that 1,1,2,2-tetrakis(4-hydroxyphenyl)ethane was used in place of α,α'-dimethyl-α,α,α', α'-tetrakis(4-hydroxyphenyl)-p-xylene. The compound 1,1,2,2-tetrakis(4-hydroxyphenyl)ethane used was TEP-DF from Asahi Organic Material Industry.

Comparative Example 6

Production of Branched Polycarbonate J

The same process as in Example 1 was repeated, except that 0.0470 mols of 1,1,1-tris(4-hydroxyphenyl)ethane was used in place of 0.0215 mols of α, α'-dimethyl-α, α, α', α'-tetrakis(4-hydroxyphenyl)-p-xylene and the amount of p-tert-butylphenol was changed to 0.447 mols.

Comparative Example 7

Production of Branched Polycarbonate K

The same process as in Example 1 was repeated, except that the amount of α, α'-dimethyl-α,α,α',α'-tetrakis(4-hydroxyphenyl)-p-xylene was changed to 0.0534 mols and that of p-tert-butylphenol was to 0.839 mols.

INDUSTRIAL APPLICABILITY

The branched polycarbonate resin of the invention has a reduced branching agent content, and has good melt characteristics including high melt tension. In addition, it has good heat stability. Therefore, the resin can be stably produced and molded even through blow molding, extrusion, vacuum forming and so on without being yellowed during the residence time in the molding process.

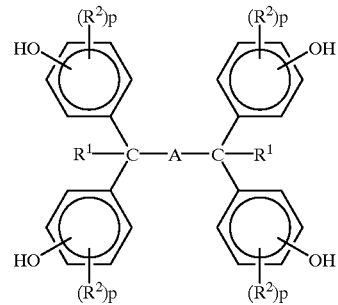

(1)

wherein A, $R^1$, $R^2$ and p are as follows:
A represents a polymethylene group having from 7 to 20 carbon atoms, an alkylene or alkylidene group having from 2 to 20 carbon atoms but excluding polymethylene groups having from 1 to 6 carbon atoms, a cycloalkylene or cycloalkylidene group having from 5 to 20 carbon atoms, an arylene or alkylarylene group having from 6 to 20 carbon atoms, an arylalkylene group having from 6 to 20 carbon atoms, —O—, —CO—, —S—, —SO—, or —$SO_2$—;
$R^1$ represents a hydrogen atom, an alkyl group having from 1 to 8 carbon atoms, an aryl group having from 6 to 20 carbon atoms, or an arylalkyl group having from 7 to 20 carbon atoms, and $R^1$'s may be the same or different;
$R^2$ represents a halogen atom, an alkyl group having from 1 to 8 carbon atoms, an aryl group having from 6 to 20

TABLE 1

|  |  |  | Branching Agent Type | Amount of Branching Agent [mol %] | η [dl/g] | Melt Tension [g] | MI [g/10 min] | ΔYI | Appearances of Moldings |
|---|---|---|---|---|---|---|---|---|---|
| Example | 1 | Branched Polycarbonate A | α,α'-dimethyl-α,α,α',α'-tetrakis(4-hydroxyphenyl)-p-xylene | 0.17 | 0.568 | 2.1 | 4.4 | 2.2 | good |
|  | 2 | Branched Polycarbonate B | α,α,α',α'-tetrakis(4-hydroxyphenyl)-p-xylene | 0.16 | 0.563 | 1.7 | 4.2 | 21.9 | good |
|  | 3 | Branched Polycarbonate C | α,α'-dimethyl-α,α,α',α'-tetrakis(3-methyl-4-hydroxyphenyl)-m-xylene | 0.15 | 0.568 | 2.0 | 4.5 | 2.2 | good |
|  | 4 | Branched Polycarbonate D | same as in Example 1 | 0.17 | 0.568 | 2.1 | 4.4 | 2.0 | good |
| Comp. | 1 | Branched Polycarbonate E | same as in Example 1 | 0.20 | 0.61 | 4.0 | 2.4 | 2.2 | bad |
| Example | 2 | Branched Polycarbonate F | same as in Example 3 | 0.20 | 0.705 | 4.5 | 1.5 | 2.2 | bad |
|  | 3 | Branched Polycarbonate G | α,α,α',α'-tetrakis(3-methyl-4-hydroxyphenyl)-p-xylene | 0.20 | 0.615 | 4.7 | 2.1 | 16.5 | bad |
|  | 4 | Branched Polycarbonate H | same as in Example 1 | 0.49 | 0.563 | 5.0 | 2.5 | 2.3 | bad |
|  | 5 | Branched Polycarbonate I | 1,1,2,2-tetrakis(4-hydroxyphenyl)ethane | 0.15 | 0.553 | 1.7 | 4.3 | 70.7 | much yellowed |
|  | 6 | Branched Polycarbonate J | 1,1,1-tris(4-hydroxyphenyl)ethane | 0.37 | 0.552 | 2.4 | 2.8 | 2.0 | bad |
|  | 7 | Branched Polycarbonate K | same as in Example 1 | 0.37 | 0.474 | 1.1 | 14.2 | 2.1 | molding impossible |

What is claimed is:

1. An uncrossed-linked branched polycarbonate resin prepared from a phenol component containing a tetrahydric phenol having formula (I) below, which serves as a branching agent in the formation of the polycarbonate structure, which branching agent content ranges from 0.01 to 0.4 mol. % as determined by the ratio of the molar amount of branching agent to the total molar amount of dihydric phenol, chain terminator and branching agent in the reaction mixture from which the polycarbonate is prepared and having an intrinsic viscosity [λ] ranging from 0.5 to 0.6, carbon atoms, or an arylalkyl group having from 7 to 20 carbon atoms, and plural $R^2$'s, if any, may be the same or different;
p is 0 or an integer ranging from 1 to 4;
or A, $R^1$, $R^2$ and p are as follows:
A represents a single bond, a polymethylene group having from 1 to 20 carbon atoms, an alkylene or alkylidene group having from 2 to 20 carbon atoms, a cycloalkylene or cycloalkylidene group having from 5 to 20 carbon atoms, an arylene or alkylarylene group having from 6 to 20 carbon atoms, an arylalkylene group having from 6 to 20 carbon atoms, —O—, —CO—, —S—, —SO—, or —$SO_2$—;

$R^1$ represents an alkyl group having from 7 to 20 carbon atoms, an aryl or alkylaryl group having from 6 to 20 carbon atoms, or an arylalkyl group having from 7 to 20 carbon atoms, and $R^1$'s may be the same or different;

$R^2$ represents a halogen atom, an alkyl group having from 1 to 8 carbon atoms, an aryl group having from 6 to 20 carbon atoms, or an arylalkyl group having from 7 to 20 carbon atoms, and plural $R^2$'s, if any, may be the same or different;

p is 0 or an integer ranging from 1 to 4.

2. The branched polycarbonate resin of claim 1, wherein the amount of said tetrahydric phenol branching agent ranges from 0.05 to 0.40 mol. %.

3. The branched polycarbonate resin according to claim 1, wherein said tetrahydric phenol is a member selected from the group consisting of α, α, α',α'-tetrakis(4-hydroxyphenyl)-p-xylene, α, α,α',α'-tetrakis(3-methyl-4-hydroxyphenyl)-p-xylene, α, α,α',α'-tetrakis(2-methyl-4-hydroxyphenyl)-p-xylene, α, α,α', α'-tetrakis(2,5-dimethyl-4-hydroxyphenyl)-p-xylene, a tetrakis(2,6-dimethyl)-4-hydroxyphenyl)-p-xylene, α, α'-dimethyl-α,α,α',α'-tetrakis(4-hydroxyphenyl)-p-xylene and α, α'-dimethyl-α,α,α', α'-tetrakis(3-methyl-4-hydroxyphenyl)-m-xylene.

4. An uncrossed-linked branched polycarbonate resin prepared from a phenol component containing a tetrahydric phenol having formula (2) below, which serves as a branching agent in the formation of the polycarbonate structure, which branching agent content ranges from 0.01 to 0.4 mol % as determined by the ratio of the molar amount of branching agent to the total molar amount of dihydric phenol, chain terminator and branching agent in the reaction mixture from which the polycarbonate is prepared and having an intrinsic viscosity [λ] ranging from 0.5 to 0.6,

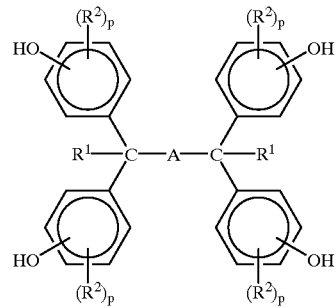

(2)

wherein $A^1$, $R^3$, $R^4$ and p are as follows:

$A^1$ represents an arylene or alkylarylene group having from 6 to 20 carbon atoms, or an arylalkylene group having from 6 to 20 carbon atoms, $R^3$ represents a hydrogen atom, an alkyl group having from 1 to 8 carbon atoms, an aryl group having from 6 to 20 carbon atoms, or an arylalkyl group having from 7 to 20 carbon atoms, and $R^3$'s may be the same or different;

$R^4$ represents a halogen atom, an alkyl group having from 1 to 8 carbon atoms, an aryl group having from 6 to 20 carbon atoms, or an arylalkyl group having from 7 to 20 carbon atoms, and plural $R^4$'s, if any, may be the same or different;

p is 0 or an integer ranging from 1 to 4.

* * * * *